United States Patent
Williams (10) Patent No.: US 9,616,722 B2
(45) Date of Patent: Apr. 11, 2017

(54) SECURING DEVICE FOR RECEIVER HITCHES

(71) Applicant: Marty Williams, Colorado Springs, CO (US)

(72) Inventor: Marty Williams, Colorado Springs, CO (US)

(*) Notice: Subject to any disclaimer, the term of this patent is extended or adjusted under 35 U.S.C. 154(b) by 0 days.

(21) Appl. No.: 14/073,640

(22) Filed: Nov. 6, 2013

(65) Prior Publication Data
US 2015/0343866 A1 Dec. 3, 2015

Related U.S. Application Data (60) Provisional application No. 61/723,252, filed on Nov. 6, 2012, provisional application No. 61/723,221, filed on Nov. 6, 2012.

(51) Int. Cl.
*B60D 1/52* (2006.01)

(52) U.S. Cl.
CPC ........... *B60D 1/52* (2013.01); *Y10T 29/49954* (2015.01)

(58) Field of Classification Search
CPC .... B60D 1/52; B60D 1/48; B60D 1/58; Y10T 29/49954
USPC ........................................................ 280/506
See application file for complete search history.

(56) References Cited

U.S. PATENT DOCUMENTS

| | | | | |
|---|---|---|---|---|
| 3,604,734 A * | 9/1971 | Friedman | ................ | A47B 9/08 108/146 |
| 4,080,080 A * | 3/1978 | Cisler | ...................... | A47B 9/14 248/188.5 |
| 5,333,888 A * | 8/1994 | Ball | ........................ | B60D 1/52 280/504 |
| 5,344,175 A * | 9/1994 | Speer | ...................... | B60D 1/58 224/521 |
| 5,372,287 A * | 12/1994 | Deguevara | ................ | B60R 9/06 224/309 |
| 5,615,904 A * | 4/1997 | Van Dusen | .............. | B60D 1/52 224/506 |
| 6,334,561 B1 * | 1/2002 | Cole | ........................ | B60R 9/06 224/519 |
| 6,409,203 B1 * | 6/2002 | Williams | ................. | B60D 1/52 224/521 |
| 6,609,725 B1 * | 8/2003 | Williams | ................. | B60D 1/06 280/506 |
| 6,688,804 B1 * | 2/2004 | Parent | .................... | B60D 1/075 280/506 |

(Continued)

*Primary Examiner* — Anne Marie Boehler
*Assistant Examiner* — Michael Stabley
(74) *Attorney, Agent, or Firm* — Lynette Wylie; Apex Juris, pllc (57) ABSTRACT

A hitch pin assembly for securing a shank member to a hitch receiver tube to minimize relative motion between the shank member and receiver tube, comprising an elongated pin having a threaded portion, a threaded nut, an elastomer piece, and a shank member which are mated for tightened engagement compressing the elastomer piece so as to firmly engage the receiver tube. The shank member may include a slot for a corresponding threaded nut and elastomer piece so when the pin is tightened, the nut compresses the elastomer against the interior wall of the shank surface and upwardly, thereby restraining movement of the threaded nut and dampening movement of the shank inside the hitch receiver tube.

14 Claims, 5 Drawing Sheets

(56) References Cited

U.S. PATENT DOCUMENTS

| | | | | |
|---|---|---|---|---|
| 6,733,029 B2* | 5/2004 | McCoy | ................... | B60D 1/485 |
| | | | | 280/506 |
| 6,773,200 B2* | 8/2004 | Cole | ........................ | B60D 1/60 |
| | | | | 403/21 |
| 6,835,021 B1* | 12/2004 | McMillan | .............. | B60D 1/155 |
| | | | | 280/504 |
| 7,004,491 B1* | 2/2006 | Allsop | ..................... | B60D 1/52 |
| | | | | 280/491.2 |
| 7,338,065 B1* | 3/2008 | Clausen | ................. | B60D 1/241 |
| | | | | 280/505 |
| 7,600,774 B1* | 10/2009 | Speer | ..................... | B60D 1/155 |
| | | | | 280/493 |
| 7,802,807 B2* | 9/2010 | Blakley | .................... | B60D 1/52 |
| | | | | 280/495 |
| 7,806,425 B2* | 10/2010 | Chang | ................... | B60D 1/241 |
| | | | | 280/506 |
| 7,823,904 B2* | 11/2010 | Coy | ......................... | B60D 1/06 |
| | | | | 280/504 |
| 8,079,613 B2* | 12/2011 | Williams | ................. | B60D 1/52 |
| | | | | 280/491.5 |
| 8,262,121 B2* | 9/2012 | Beck | ........................ | B60D 1/06 |
| | | | | 280/491.2 |
| 8,308,185 B2* | 11/2012 | Weaver | ................. | B60D 1/025 |
| | | | | 280/506 |
| 8,419,041 B2* | 4/2013 | Bessette | ................... | B60D 1/06 |
| | | | | 280/506 |
| 8,596,664 B2* | 12/2013 | Lahn | ....................... | B60D 1/06 |
| | | | | 280/495 |
| 8,696,011 B2* | 4/2014 | Despres | .................. | B60D 1/06 |
| | | | | 280/478.1 |
| 8,944,516 B2* | 2/2015 | Eidsmore | ................. | B60P 1/28 |
| | | | | 280/506 |

* cited by examiner

SECURING DEVICE FOR RECEIVER HITCHES

CROSS REFERENCES TO RELATED APPLICATIONS

This application claims the benefit of provisional U.S. patent application Ser. No. 61/723,221, filed on Nov. 6, 2012, and provisional U.S. patent application Ser. No. 61/723,252, filed on Nov. 6, 2012, which are incorporated herein by reference.

FIELD OF THE INVENTION

This invention relates to the field of securing devices for receiver hitch assemblies and particularly to the field of securing devices that minimize the relative movement between the receiver and shanks of such assemblies and securing, locking and preventing loosening of threaded connections.

BACKGROUND OF THE INVENTION

Many vehicles today are equipped with receiver-type trailer hitches. These types of trailer hitches typically are a square tube, normally 1¼" or 2" internal height and width, attached to the undercarriage of the vehicle. A second tube acts as a shank and includes outer dimensions slightly smaller than the internal dimensions of the receiver tube and is slidable within the receiver tube. The shank member is connected to the receiver tube by a pin inserted through the two tubes and locked or clipped to prevent relative movement between the two tubes.

Moreover, conventional techniques for locking threaded connections involve either mechanical metal split rings, external/internal tooth or Schnoor type metal spring metal-to-metal designs that gouge into the substrate causing surface deformities that can lead to accelerated rusting due to the penetration of the protective coating media by the locking device.

In highly corrosive environments like a receiver style hitch that encounters a variety of caustic substances, keeping the powder coating or paint on the hitch unmarred is critical when attaching, securing and removing towing products and accessories using methods that eliminate or remove dangerous and unwanted movement and noise in the hitch connection.

In another embodiment of the receiver-type trailer hitches, the shank is a solid, substantially square bar. Usually a 1¼" or 2" square with rounded corners. The solid shank is used more often with 1 or 1¼" type hitch mounts.

The shank member may include a standard ball-mount for engaging with the hitch of a trailer or other wheeled vehicle. Another popular use for receiver hitches is the use as a coupling device for installing equipment racks, ski carriers, storage boxes and other types of carriers have been designed to use the above-described second tube to engage within a receiver hitch tube. This provides a universal system that allows a vehicle user to be able to use various trailer and carriers with a single coupling system.

A particular problem with the use of these receiver coupling systems is the clearance between the internal dimensions of the receiver tube and the external dimensions of the shank member. These tubes by necessity must have sufficient clearance to be able to be easily telescoped together. However, this clearance between the two tubes causes relative movement between the two tubes. The shank member tends to rattle or chatter within the receiver tube. This rattle or chatter is at best an annoyance and at worst can distract the driver or cause damage to the trailer or the carrier.

There have been a number of attempts to solve this problem in the past. These attempts all required the use of specially designed receivers, shanks, or accessories in order to reduce the rattle between the receiver and shank. Examples of these prior attempts are disclosed in U.S. Pat. No. 5,423,566; U.S. Pat. No. 5,593,172; U.S. Pat. No. 5,735,539; U.S. Pat. No. 5,879,102; U.S. Pat. No. 5,988,667; U.S. Pat. No. 6,010,049; U.S. Pat. No. 6,010,143; U.S. Pat. No. 6,010,144; and U.S. Pat. No. 6,105,989. These prior art devices either require specially designed receivers and shanks or use extraneous mounting devices to minimize the rattle between the receiver and the shank.

At present, there are a number of motion reducing designs for receiver style hitches useful for both hollow shanks and solid shanks. However, there persists a need for a device that will minimize the rattle between the receiver tube and the shank member.

SUMMARY OF THE INVENTION

The present invention addresses a new assembly and method of restraining motion in receiver style hitch connections, and includes without limitation securing, locking and preventing loosening of threaded connections. The present invention utilizes an elastomeric material in a piece which can take the form of a deformable washer or an elastomer block with a threaded compressible connection to effect a locked bolt and nut connection.

At present there are a number of motion reducing designs for receiver style hitches useful for both hollow shanks and solid shanks. The present invention utilizes a shank ball mount with a slot created on one side of the shank. Into this slot is placed a threaded nut and elastomer piece. This assembly is slid into the hitch with the hitch wall holding the nut and elastomer in the slot. A threaded pin is then inserted from the opposite side to engage the threaded nut and pull the shank to the threaded pin head side of the hitch receiver wall. When the pin is tightened the nut squeezes the elastomer causing the material to flow upward and downward into the small cavity between the shank surface and the inside of hitch tubing surface. The elastomer displaces the open space to dampen movement of the shank inside the hitch receiver tube.

The surface area, i.e., diameter and thickness, and durability of the elastomer material specification relate to the foot pounds of force required to affect the locking, dampening and noise controlling technique.

The locking technique and assembly of the present invention is induced by the threaded tightening of the connection causing the elastomer to flow outward past the shank diameter whereby the elastomer impacts the receiver tubing and fills the unsupported portion of the cavity which effectively locks the connection with the energy stored in the incompressible elastomer. This securing device minimizes the rattling and relative movement of the shank member and the receiver tube due to the clearance between the shank member and the receiver tube. A preferred embodiment of the present invention solves these problems by providing the securing device for use in most receiver assemblies. The present invention allows users to install the securing device of the preferred embodiments without the need for special tools or modification of the receiver assemblies. The securing device also includes a hitch pin assembly. The hitch pin includes a threaded portion that engages the nut assembly. The shank member is inserted into the receiver tube until the opposing side holes of the shank member are aligned with opposing side holes in the receiver tube. The hitch pin is then inserted through the side holes of the receiver tube and the shank member until the threaded portion of the hitch pin engages the nut mounted within the shank member. The hitch pin is then rotated relative to the nut to clamp the shank member against the receiver tube and expand the elastomer against the top and bottom internal surface of the receiver tube. A lock or clip can be attached to the end of the hitch pin to prevent accidental or unauthorized removal of the hitch pin from the receiver assembly. A bushing can also be used over the reduced diameter portion of the hitch pin after it engages the nut.

The present invention further comprises an assembly for locking a threaded connection, which includes an elongated pin having a threaded portion, a nut having a threaded hole for engagement with the threaded portion of the elongated pin, an elastomer washer having a hole for receiving the elongated pin; and a first component having a hole for receiving the elongated pin such that mated coupling of the elongated pin with the hole of the elastomer washer and a component having a hole for receiving the elongated pin such that mated coupling of the elongated pin with the hole of the elastomer piece and the component are secured when the elongated pin is tightened in threaded engagement with the threaded hole of the nut such that the elastomer washer is compressed between the nut and the component. The connection tension of the assembly of the present invention corresponds to the elastomer surface area, thickness and density. As used herein, an elastomer piece is a conformable material configured in any size and shape, including, without limitation a washer or block, which is adaptable for use to lock, restrain, or dampen a joint connection.

These and other features will be evident from the ensuring detailed descriptions of preferred embodiment and from the drawings.

DETAILED DESCRIPTION OF PREFERRED EMBODIMENTS

Figure 1A:
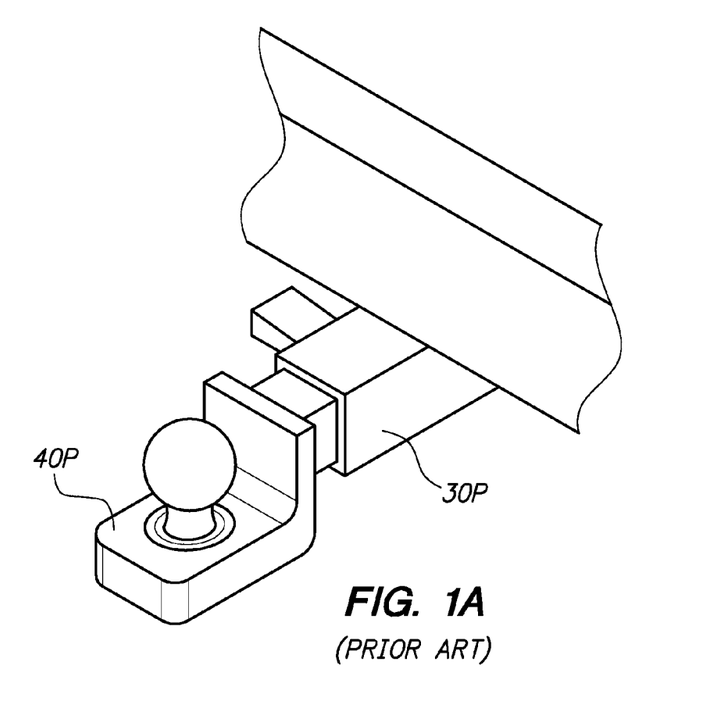
FIG. 1A is a side perspective view of a prior art hitch ball assembly.

Now referring to the drawings, FIG. 1A shows a prior art hitch assembly 40P and hitch receiver 30P. A preferred embodiment of the present invention is illustrated in FIGS. 1B-6. It is to be expressly understood that the descriptive embodiment is provided herein for explanatory purposes only and is not meant to unduly limit the claimed inventions. The preferred embodiment of the present invention is intended for use with receiver hitch systems including trailer mounts as well as carriers. The preferred embodiment may be used for original equipment installations and as an after market item.

Figure 1B:
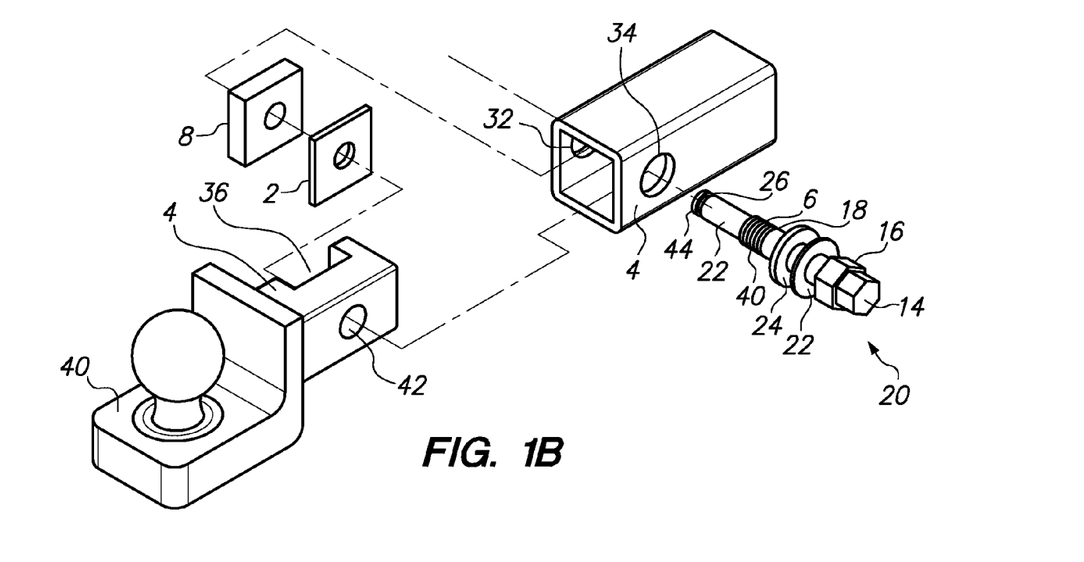
FIG. 1B is an exploded perspective view of a hitch ball assembly utilizing securing device for receiver hitches according to the present invention.
Figure 2A:
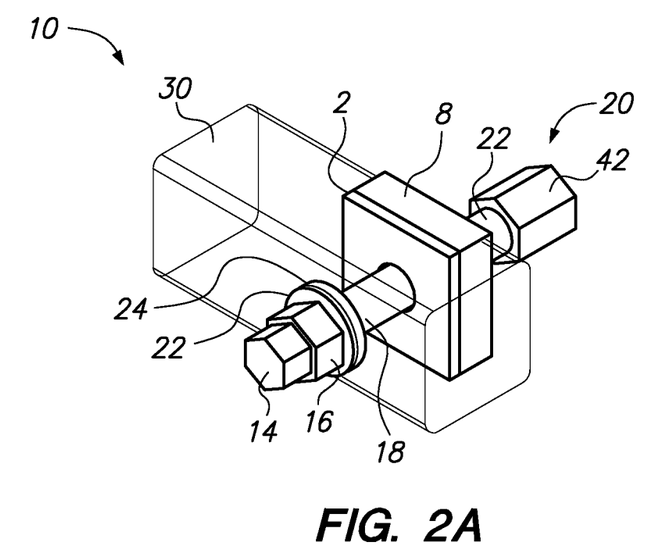
FIG. 2 is a side perspective view of the thread locking assembly of the present invention in use.
Figure 2B:
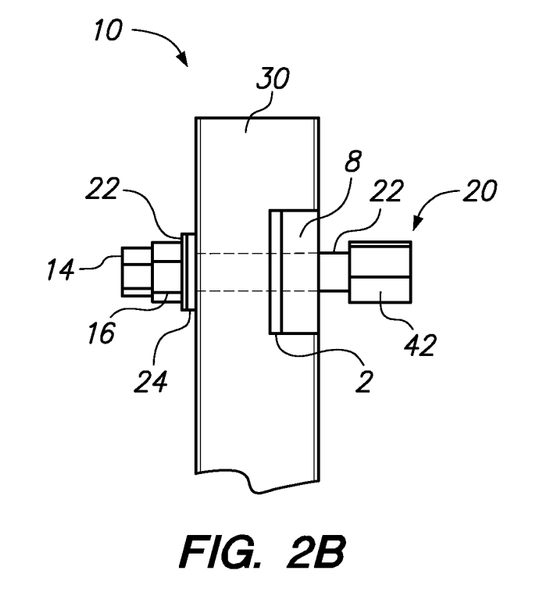
Figure 3:
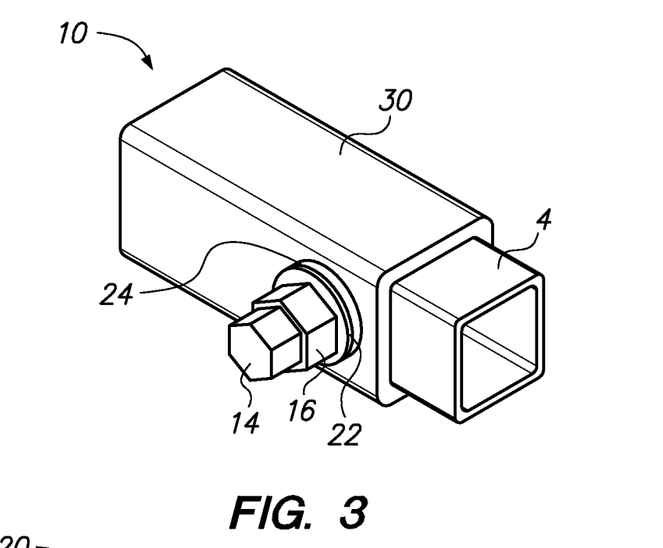
FIG. 3 is a perspective view of the present invention in use.

In the preferred embodiment, as shown in FIG. 1B, receiver hitch assembly 40 includes receiver tube 30 mounted beneath a bumper of a vehicle. Receiver tube 30 is mounted to the vehicle by well known mounting techniques, such as by bolting or welding. In this preferred embodiment receiver tube 30 includes either 1½ inch square tubing or 2 inch square tubing (internal dimensions). It is to be expressly understood that other sizes of shapes of tubing can be used as well.

Shank member 4, as shown in FIGS. 1B-6 includes a portion having a shape similar to the shape of the internal portion of receiver tube 30A and an external diameter slightly less than the internal diameter of the receiver tube 30. This enables the shank member 4 to be inserted within the receiver tube 30 in a telescoping manner. In most typical receiver hitch assemblies, the difference in the dimensions of the internal portion of the receiver tube 30 and the external portion of the shank member 304 is about 1/16 inch (one-sixteenth inch) to allow the shank member 4 to be easily inserted within the receiver tube 20. In the exemplary embodiment described herein, shank member 4 is illustrated a having a trailer hitch ball mounted thereon. It is to be expressly understood that the claimed inventions also includes shank members having carriers mounted thereon, such as bicycle carriers, ski carriers, cargo compartments, platforms and other types of receiver mounted devices.

As shown in FIGS. 1B, 2A, 2B, 3A and 3B, receiver tube 2030 includes opposing side holes 32-34. The shank member 4 also includes a through hole 42 that aligns with the opposing side holes 32-34 of the receiver tube 30A as the shank member 4 is inserted into the receiver tube 30. Hitch pin assembly 20 is inserted through side holes 32-35 of the receiver tube 30 and the side hole 42 of the shank member 304 to the receiver tube 30.

Figure 4A:
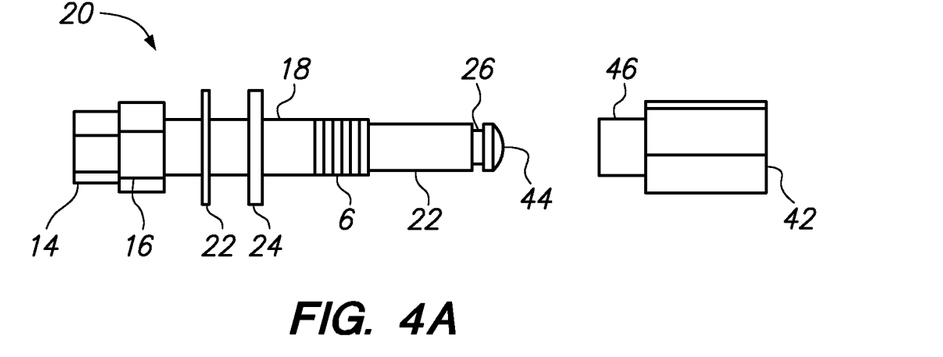
FIG. 4A is a side perspective view of the present invention in unengaged position.
Figure 4B:
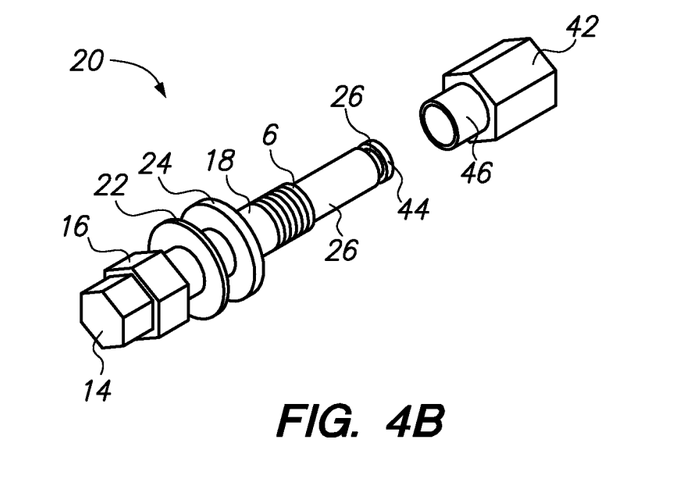
FIG. 4B is another side perspective view of the present invention in unengaged position.

Now referring to FIGS. 4A-4B in conjunction with the latter illustrations of the in a preferred embodiment of the present invention, hitch pin assembly 20 includes a head portion 14, an elongated portion 18, a locking groove 26 and a tapered end 44. Elongated portion 18 includes a threaded section 6 and a reduced diameter portion 22. The threaded section 6 of elongated portion 18 is spaced a distance "d" from head portion 14. This distance "d" is preferably equal to or less than the combined thicknesses of the side walls of the receiver tube 30 and the shank member 4. In the preferred embodiment, head portion 14 includes a hex shaped detail, but could also be a wing or handle shape, square or allen head or any other shape or configuration.

Hitch pin assembly 10 also includes a nut assembly 20. Nut assembly 20 includes a nut 22 having an internal threaded portion 6 for mating engagement with threaded section 6 of pin 14. The outer dimension of the nut 22 is selected to prevent the nut from rotating with the internal portion of the shank member 4 as discussed below. Elastomer washer 24 is positioned to the inside of nut 22. The elastomer washer 24 is sized so that it is in a state of compression when the nut 8 and elastomer block 2 are inserted within the shank member 4, as discussed below.

Another component of hitch pin assembly 10 is a lock engageable over the tapered end 44 of pin 14 and locks onto locking groove 26.

Figure 5A:
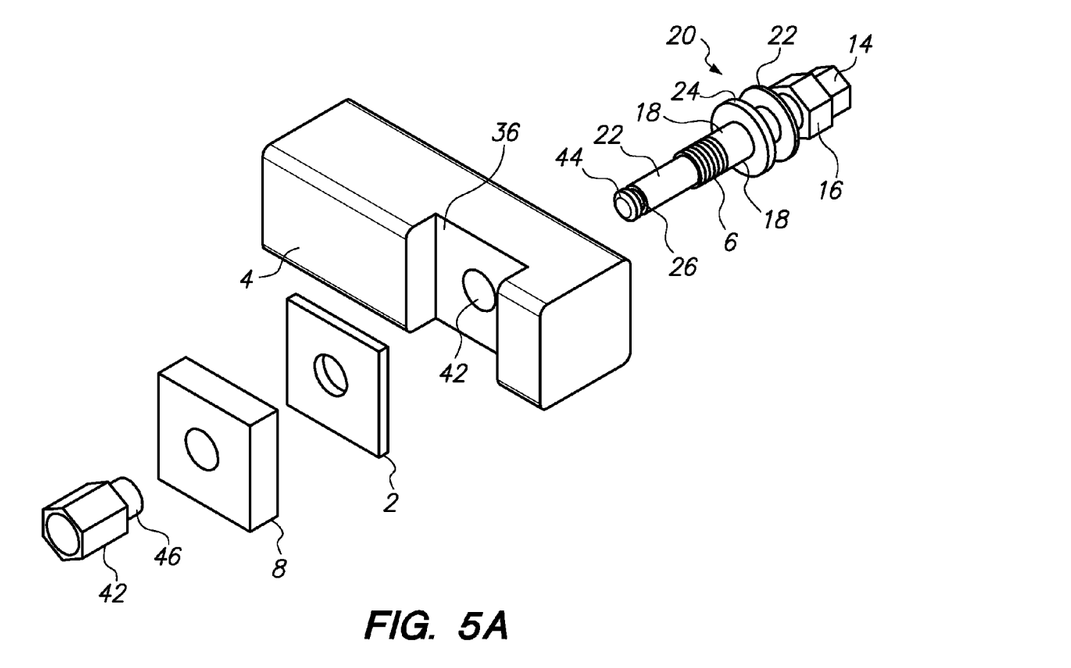
FIG. 5A is an exploded view of the hitch receiver of the present invention including the thread locking and motion dampening elastomer components in unassembled position.
Figure 5B:
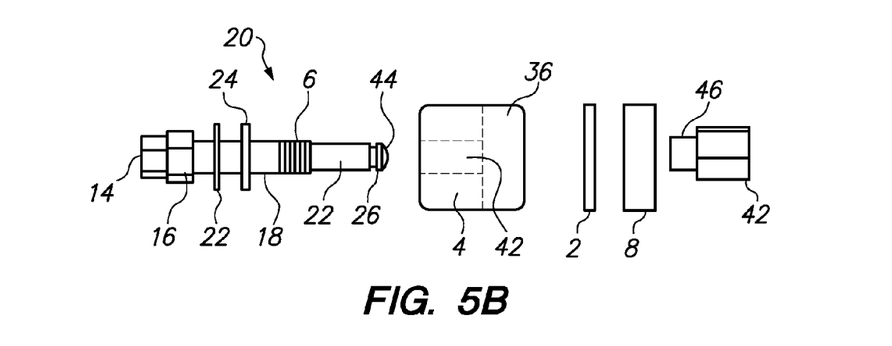
FIG. 5B is another exploded view of the present invention shown with an end perspective of a receiving shank in unassembled position.

Now referring to FIGS. 5A-5B illustrating the preferred embodiment in use, nut 8 and elastomer block 2 are inserted within the matching cavity 36 on the side of shank member 4. Elastomer block 2 is positioned between the inner side wall of the shank member 4, slot 36 and the nut 2 to maintain the alignment between the threaded portion 6, shank member 4, hole 42 and the receiver tube 30 side holes 32, 34.

Figure 6:
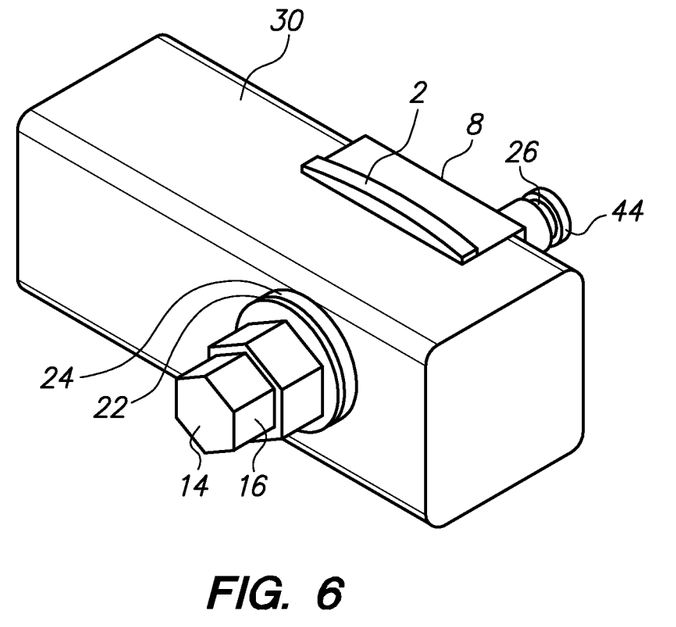
FIG. 6 is a side perspective view of the present invention in assembled position.

Shank member 4 is then ready for insertion into the receiver tube 30 once the nut 8 and elastomer block 2 have been installed within the shank member 4. Shank member 4 is "telescoped" within receiver tube 30 until the side hole 42 is aligned with the side holes 32, 34 of the receiver tube. Pin assembly 20 is then inserted into the side holes 32, 34 until the threaded portion 6 of the pin assembly 20 engages the threaded portion 6 of pin assembly 20. Pin 14 is then rotated relative to the nut 16 to tighten the nut 16 against the elastomer block 2 which in turn is tightened against the inside wall of pocket slot 36 of the shank member 4. The size of the nut 8 is selected to ensure that the nut cannot rotate within the shank member 4. As the pin 14 continues to be rotated relative to nut 16, nut 16 exerts pressure against elastomer block and inner side wall of the shank member 4 which in turn clamps against the inner side wall of the receiver tube 30. The hex head of pin 14 in combination with the use of a wrench allows the nut 16 to be sufficiently tightened against the side of the elastomer block 2 and wall of the shank member 4 so that the top and bottom of the elastomer block 2 flows out of the top and bottom of the shank as shown in FIG. 6 and restrains the relative movement between the shank member 4 and the receiver tube 30, while the shank is simultaneously compressed against the inside surface of the receiver tube 30 and with any resultant movement being minimized or even eliminated. Thus the rattling of the shank member and associated trailer or carrier mounts is minimized. Wear between the shank member and receiver tube and the distracting aspect of noise is minimized as well.

A lock can then be secured and locked onto the end 44 of the pin assembly 20 to prevent unauthorized removal of the pin assembly 20 and the shank member 34. In another preferred embodiment, pin 14 includes a groove 26 to engage a clip pin to prevent the pin from loosening or being removed. Other types of securing mechanisms can be used as well to prevent the removal of pin 14 from the shank member 4 and receiver tube 30.

In another alternative embodiment, bushing 42 can be provided to go over the elongated portion 18 of pin 14. Bushing 42 butts up against the shoulder 44 such that recessed portion 46 seats into locking groove 26 of the pin to ensure that the pin 14 fits tightly within the side holes 32, 34 and of the receiver tube 30 of the shank member 4. As previously described, an alternative lock to ensure a tight fit between the components can be utilized.

It is to be expressly understood that these exemplary embodiments are provided for descriptive purposes only and not meant to unduly limit the scope of the claimed inventions. Other embodiments are also considered to be within the scope of the present inventions.

What is claimed is:

1. A method for securing a shank member to a receiver tube to minimize relative motion between the shank member and receiver tube, comprising the steps of:
providing an elongated pin having a threaded portion;
providing a nut having a threaded portion for engagement with the threaded portion of the elongated pin;
providing an elastomer piece having a hole for receiving the elongated pin;
providing a shank member having a recessed slot within an indented wall; wherein the shank member includes a hole for receiving the elongated pin;
providing a receiver tube having a first opposing side hole and a second opposing side hole formed in transverse alignment in opposing side walls of the receiver tube;
inserting the shank member within the receiver tube until the opposing side holes of the shank member are aligned with opposing side holes of the receiver tube;
inserting the elongated pin through the first opposing side holes of the receiver tube and the opposing side holes formed in the shank member and then the second opposing side hole of the receiver tube;
engaging the threaded portion of the elongated pin with the threaded portion of the nut until the elastomer piece is compressed against the recessed slot upon tightened engagement of the threaded portion of the elongated pin with the threaded hole of the nut, so the shank member is firmly engaged in the receiver tube.

2. The method of claim 1, wherein the step of engaging the threaded portion of the elongated pin with the threaded portion of the elongated pin tightens the elongated pin with the threaded hole of the nut to thereby compress the elastomer piece against the interior wall of the slot of the shank member so as to restrain movement of the shank member within the receiver tube.

3. The method of claim 1, wherein the method further comprises: providing an elastomer block configured for seated engagement within the recessed slot wherein tightened engagement of the threaded portion of the elongated pin with the threaded hole of the nut compresses the elastomer block against the indented side wall surface of the slot of the shank member whereby movement of the shank member within the receiver tube is dampened and wherein the elastomer piece is adjacent to the nut surface such that compression of the nut against the elastomer piece restrains movement of the nut.

4. The method of claim 3, wherein the method further comprises: providing an elastomer block configured for seated engagement within the interior side wall of the slot wherein tightened engagement of the threaded portion of the elongated pin with the threaded hole of the nut compresses the elastomer block against the indented side wall surface of the slot of the shank member to thereby push the elastomer block beyond an upper and lower periphery of the slot such that the elastomer block engages a corresponding interior surface area of the receiver tube whereby movement of the shank member within the receiver tube is dampened and wherein the elastomer piece is adjacent to the nut surface such that compression of the nut against the elastomer piece restrains movement of the nut.

5. The method of claim 1, wherein the method further comprises: providing an elastomer block configured for seated engagement within the interior side wall of the slot wherein tightened engagement of the threaded portion of the elongated pin with the threaded hole of the nut compresses the elastomer block against the interior side wall surface of the slot of the shank member to thereby compress the elastomer piece so as to form a joined surface coextensive with the nut surface facing the elastomer piece such that the joined surface forms an outer perimeter extending to the nut periphery corresponding to a locked position.

6. A hitch pin assembly for securing a shank member to a receiver tube to minimize relative motion between the shank member and receiver tube, comprising:
- an elongated pin having a threaded portion;
- a nut having a threaded hole for engagement with the threaded portion of the elongated pin;
- an elastomer piece having a hole for receiving the elongated pin; and
- a shank member having a hole for receiving the elongated pin such that mated coupling of the elongated pin with the hole of the elastomer piece and the shank member when tightened by threaded engagement of the elongated pin with the threaded hole of the nut compresses the elastomer piece so as to firmly engage the receiver tube, wherein the shank member has a recessed slot with an indented wall against which the elastomer piece is compressed upon tightened engagement of the threaded portion of the elongated pin with the threaded hole of the nut.

7. The hitch pin assembly of claim 6, wherein tightened engagement of the threaded portion of the elongated pin with the threaded hole of the nut compresses the elastomer piece against the interior wall of the slot of the shank member so as to restrain movement of the shank member within the receiver tube.

8. The hitch pin assembly of claim 6, wherein the shank member has a recessed slot with an indented side wall and wherein the elastomer piece is configured for seated engagement within the indented side wall of the slot wherein tightened engagement of the threaded portion of the elongated pin with the threaded hole of the nut compresses the elastomer piece against the indented side wall surface of the slot of the shank member.

9. The hitch pin assembly of claim 8, wherein tightened engagement of the threaded portion of the elongated pin with the threaded hole of the nut compresses the elastomer piece against the indented side wall of the slot of the shank member to thereby push the elastomer piece beyond an upper and lower periphery of the slot such that the elastomer piece engages a corresponding interior surface area of the receiver tube whereby movement of the shank member within the receiver tube is restrained.

10. The hitch pin assembly of claim 6, wherein the shank member has a recessed slot with an indented side wall and further comprising an elastomer block configured for seated engagement within the indented side wall of the slot wherein tightened engagement of the threaded portion of the elongated pin with the threaded hole of the nut compresses the elastomer block against the indented side wall surface of the slot of the shank member whereby movement of the shank member within the receiver tube is dampened and wherein the elastomer piece is adjacent to the nut surface such that compression of the nut against the elastomer piece restrains movement of the nut.

11. The hitch pin assembly of claim 6, wherein the shank member has a recessed slot with an interior side wall and further comprising an elastomer block configured for seated engagement within the indented side wall of the slot wherein tightened engagement of the threaded portion of the elongated pin with the threaded hole of the nut compresses the elastomer block against the indented side wall surface of the slot of the shank member to thereby push the elastomer block beyond an upper and lower periphery of the slot such that the elastomer block engages a corresponding interior surface area of the receiver tube whereby movement of the shank member within the receiver tube is dampened and wherein the elastomer piece is adjacent to the nut surface such that compression of the nut against the elastomer piece restrains movement of the nut.

12. A pin restraint assembly, comprising:
- an elongated pin having a threaded portion;
- a nut having a threaded hole for engagement with the threaded portion of the elongated pin;
- an elastomer washer having a hole for receiving the elongated pin a component such that mated coupling of the elongated pin with the hole of the elastomer washer, the nut compressibly locks the elongated pin when tightened in threaded engagement with the threaded hole of the nut such that the elongated pin is restrained from movement;
- wherein tightened engagement of the threaded portion of the elongated pin with the threaded hole of the nut compresses the elastomer washer so as to form a joined surface coextensive with the nut surface facing the elastomer washer such that the joined surface forms an outer perimeter extending to the nut periphery corresponding to a locked position.

13. The pin restraint assembly of claim 12, wherein tightening of the elongated pin into threaded engagement with the threaded hole of the nut provides a connection tension corresponding to the elastomer washer surface area engaging the nut surface facing the elastomer washer.

14. The pin restraint assembly of claim 12, further comprising a shank member with a hole corresponding to the elongated pin wherein tightening of the elongated pin into threaded engagement with the threaded hole of the nut and through the hole of the shank member restrains movement between the nut and the shank member.

* * * * *